United States Patent
Desai

(10) Patent No.: US 11,071,001 B2
(45) Date of Patent: *Jul. 20, 2021

(54) RADIO SENSOR COVERAGE ESTIMATION FOR WIRELESS NETWORK ASSURANCE

(71) Applicant: Cisco Technology, Inc., San Jose, CA (US)

(72) Inventor: Vishal S. Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,539

(22) Filed: Jan. 13, 2020

(65) Prior Publication Data

US 2020/0154301 A1 May 14, 2020

Related U.S. Application Data

(63) Continuation of application No. 15/875,650, filed on Jan. 19, 2018, now Pat. No. 10,536,871.

(Continued)

(51) Int. Cl.
*H04W 24/10* (2009.01)
*H04W 24/04* (2009.01)
(Continued)

(52) U.S. Cl.
CPC .......... *H04W 24/10* (2013.01); *H04W 4/025* (2013.01); *H04W 16/18* (2013.01); *H04W 24/04* (2013.01);
(Continued)

(58) Field of Classification Search
CPC ... H04W 16/18; H04W 16/025; H04W 24/04; H04W 24/10; H04W 64/003; H04W 64/006; H04W 72/0433; H04W 92/12
See application file for complete search history.

(56) References Cited

U.S. PATENT DOCUMENTS 6,505,045 B1 * 1/2003 Hills ..................... H04W 16/18
455/422.1
6,506,045 B2 1/2003 Corocher et al.
(Continued)

FOREIGN PATENT DOCUMENTS

WO 2011157290 A1 12/2011
WO 2013107494 A1 7/2013

OTHER PUBLICATIONS

Cisco, "Cisco Wireless Release 8.5 Product Bulletin," Updated Aug. 10, 2017, Document ID: 1502404661464189, 7 pages, https://www.cisco.com/c/en/us/products/collateral/wireless/8500-series-wireless-controllers/bulletin-c25-739409.html.

(Continued)

*Primary Examiner* — Dung B Huynh
(74) *Attorney, Agent, or Firm* — Patterson + Sheridan, LLP

(57) ABSTRACT

An apparatus, computer program product, and method relating to radio sensor coverage estimation for wireless network assurance. A network controller estimates a network sensor coverage level for candidate access points (APs), based on potential use of the candidate APs as network sensors to measure at least one key performance indicator (KPI). The controller determines a subset of the candidate APs, based on evaluating candidate APs for suitability as network sensors. The controller estimates a second network sensor coverage level for the subset of candidate APs, based on potential use of the subset of candidate APs as network sensors. The controller determines that the second network sensor coverage level is within a pre-defined threshold of the first network sensor coverage level, and provisions a radio in each AP in the subset of candidate APs as a network sensor to measure at least one KPI.

20 Claims, 11 Drawing Sheets

Related U.S. Application Data

(60) Provisional application No. 62/527,810, filed on Jun. 30, 2017.

(51) Int. Cl.
| | |
|---|---|
| *H04W 4/02* | (2018.01) |
| *H04W 16/18* | (2009.01) |
| *H04W 72/04* | (2009.01) |
| *H04W 92/12* | (2009.01) |
| *G01S 5/02* | (2010.01) |
| *H04W 64/00* | (2009.01) |

(52) U.S. Cl.
CPC ....... *H04W 72/0433* (2013.01); *G01S 5/0252* (2013.01); *H04W 64/003* (2013.01); *H04W 64/006* (2013.01); *H04W 92/12* (2013.01)

(56) References Cited

U.S. PATENT DOCUMENTS

| | | | | |
|---|---|---|---|---|
| 7,565,148 | B2* | 7/2009 | Alicherry | H04W 64/00 455/446 |
| 8,576,812 | B2* | 11/2013 | Gray | H04W 24/08 370/338 |
| 8,983,470 | B1* | 3/2015 | Ryan | H04W 24/02 455/436 |
| 9,025,463 | B1* | 5/2015 | Mankee | H04W 72/0413 370/237 |
| 9,277,509 | B1* | 3/2016 | Sitaram | H04W 52/34 |
| 9,319,872 | B1* | 4/2016 | Malreddy | H04W 24/02 |
| 9,723,493 | B2* | 8/2017 | Atreya | H04W 16/18 |
| 9,730,009 | B1* | 8/2017 | Rodoper | H04W 4/029 |
| 9,986,455 | B1* | 5/2018 | Linkola | H04W 28/0226 |
| 2004/0218602 | A1 | 11/2004 | Hrastar | |
| 2005/0227672 | A1* | 10/2005 | Lauzon | G08B 21/10 455/412.2 |
| 2006/0056329 | A1* | 3/2006 | Ookuma | H04B 7/155 370/315 |
| 2006/0077918 | A1* | 4/2006 | Mao | H01Q 1/246 370/310 |
| 2006/0281441 | A1* | 12/2006 | Okochi | H04W 12/0431 455/411 |
| 2007/0076590 | A1 | 4/2007 | Galpin et al. | |
| 2008/0130552 | A1* | 6/2008 | Wang | H04W 74/006 370/328 |
| 2008/0162921 | A1* | 7/2008 | Chesnutt | H04W 12/1202 713/2 |
| 2009/0005052 | A1* | 1/2009 | Abusch-Magder | H04W 24/02 455/446 |
| 2009/0022121 | A1 | 1/2009 | Budampati et al. | |
| 2009/0167535 | A1* | 7/2009 | Sanchez | H04L 9/0833 340/573.1 |
| 2009/0238162 | A1* | 9/2009 | Yoneyama | H04W 48/00 370/338 |
| 2009/0316585 | A1 | 12/2009 | Srinivasan et al. | |
| 2010/0118830 | A1* | 5/2010 | Stephenson | H04L 63/10 370/331 |
| 2010/0159949 | A1* | 6/2010 | Selgert | H04W 64/003 455/456.1 |
| 2010/0222106 | A1* | 9/2010 | Wang | H04W 52/343 455/562.1 |
| 2010/0285790 | A1* | 11/2010 | Baliosian | H04W 88/02 455/422.1 |
| 2011/0084800 | A1* | 4/2011 | Ko | H04L 63/1416 340/5.74 |
| 2011/0153801 | A1* | 6/2011 | Ji | H04L 63/1416 709/224 |
| 2011/0195731 | A1* | 8/2011 | Jang | H04W 52/243 455/501 |
| 2011/0210843 | A1* | 9/2011 | Kummetz | G01S 5/06 340/517 |
| 2012/0142347 | A1* | 6/2012 | Morad | H04W 24/06 455/435.1 |
| 2012/0155326 | A1* | 6/2012 | Park | H04W 16/32 370/254 |
| 2012/0172083 | A1* | 7/2012 | Logalbo | H04W 8/186 455/525 |
| 2013/0107736 | A1* | 5/2013 | Yamada | H04W 48/18 370/252 |
| 2013/0286868 | A1* | 10/2013 | Oyman | H04W 24/08 370/252 |
| 2014/0071877 | A1* | 3/2014 | Akiyoshi | H04W 52/0209 370/311 |
| 2014/0170965 | A1* | 6/2014 | Li | H04W 16/26 455/7 |
| 2014/0187254 | A1* | 7/2014 | Wang | H04W 24/04 455/452.1 |
| 2015/0085745 | A1* | 3/2015 | Atreya | H04W 16/18 370/328 |
| 2015/0223084 | A1* | 8/2015 | Lightstone | H04L 5/0048 370/252 |
| 2015/0382290 | A1* | 12/2015 | Yaacoub | H04W 24/02 370/311 |
| 2016/0075245 | A1* | 3/2016 | Logvinov | B60L 53/126 320/108 |
| 2016/0150420 | A1* | 5/2016 | Byun | H04W 24/02 370/312 |
| 2016/0165462 | A1* | 6/2016 | Tan | H04W 24/02 370/254 |
| 2016/0174147 | A1* | 6/2016 | Chen | H04W 64/00 370/252 |
| 2016/0330631 | A1* | 11/2016 | Wu | H04W 74/08 |
| 2017/0064557 | A1* | 3/2017 | Alsohaily | H04W 16/14 |
| 2017/0187446 | A1* | 6/2017 | Buesker | H04B 7/15557 |
| 2017/0205490 | A1* | 7/2017 | Mathew | G01S 13/08 |
| 2017/0238192 | A1* | 8/2017 | Lee | H04W 4/70 455/500 |
| 2017/0311180 | A1* | 10/2017 | Jalden | H04B 7/0617 |
| 2017/0324439 | A1* | 11/2017 | Desai | H04W 24/02 |
| 2017/0325104 | A1* | 11/2017 | Desai | H04W 72/0453 |
| 2017/0339572 | A1* | 11/2017 | Liang | H04W 16/20 |
| 2018/0027399 | A1* | 1/2018 | Seidman | H04W 8/22 455/456.1 |
| 2019/0007856 | A1 | 1/2019 | Desai | |
| 2019/0045583 | A1* | 2/2019 | Van Phan | H04W 76/15 |
| 2019/0258826 | A1* | 8/2019 | Rose | G06F 21/6254 |

OTHER PUBLICATIONS

Cisco, "Radio Resource Management White Paper-Chapter: Flexible Radio Assignment (FRA) and Redundant Radios," Updated Jun. 24, 2016, 19 pages, https://www.cisco.com/c/en/us/td/docs/wireless/controller/technotes/8-3/b_RRM_White_Paper/b_RRM_White_Paper_chapter_01000.html.

PCT Notification of Transmittal of The International Search Report and The Written Opinion of the International Searching Authority or the Declaration for Application No. PCT/US2018/038787 dated Sep. 13, 2018.

Li Xun et al: "Energy-efficient data acquisition in wireless sensor networks through spatial correlation", Mechatronics and Automation (I CMA), 2011 International Conference on, IEEE, Aug. 7, 2011 (Aug. 7, 2011)' pp. 1068-1073, XP032019777, DOI: 10.1109/ICMA2011.5985808 ISBN: 978-1-4244-8113-2 p. 1068—p. 1071.

Yoon Yourim et al: "An Efficient Genetic Algorithm for Maximum Coverage Deployment in Wireless Sensor Networks", IEEE Transactions on Cybernetics, IEEE, Piscataway, NJ, USA, vol . 43, No. 5, Oct. 1, 2013 (Oct. 1, 2013), pp. 1473-1483, XP011526549, ISSN: 2168-2267, DOI: 10.1109/TCYB.2013.2250955 [retrieved on Sep. 11, 2013] p. 1473-p. 1476.

* cited by examiner

FIG. 8A

| SUPPLEMENTAL_LIST | |
|---|---|
| SENSOR / NEIGHBOR | |
| | |
| | |
| | |
| | |
| | |
| | |

| COVERED_NEIGHBORS | |
|---|---|
| SENSOR / NEIGHBOR | |
| AP1 | AP2 |
| AP1 | AP3 |
| AP1 | AP4 |
| AP1 | AP5 |
| | |
| | |

| AVAILABLE_SENSORS |
|---|
| SENSOR |
| AP1 |
| AP2 |
| AP3 |
| |

FIG. 8B

SUPPLEMENTAL_LIST

| SENSOR | AP2 | AP2 |  |  |  |  |
|---|---|---|---|---|---|---|
| NEIGHBOR | AP4 | AP5 |  |  |  |  |

COVERED_NEIGHBORS

| SENSOR | AP1 | AP1 | AP1 | AP1 | AP2 | AP2 |
|---|---|---|---|---|---|---|
| NEIGHBOR | AP2 | AP3 | AP4 | AP5 | AP1 | AP6 |

AVAILABLE_SENSORS

| SENSOR | AP1 | AP2 | AP3 |
|---|---|---|---|

FIG. 8C

SUPPLEMENTAL_LIST

| SENSOR | AP2 | AP2 | AP3 | AP3 | | |
|---|---|---|---|---|---|---|
| NEIGHBOR | AP4 | AP5 | AP1 | AP5 | | |

COVERED_NEIGHBORS

| SENSOR | AP1 | AP1 | AP1 | AP1 | AP2 | AP2 |
|---|---|---|---|---|---|---|
| NEIGHBOR | AP2 | AP3 | AP4 | AP5 | AP1 | AP6 |

AVAILABLE_SENSORS

| SENSOR | AP1 | AP2 | AP3 | |
|---|---|---|---|---|

FIG. 8D

SUPPLEMENTAL_LIST

| SENSOR | NEIGHBOR |
|---|---|
| AP2 | AP4 |
| AP2 | AP5 |
| AP3 | AP1 |
| AP3 | AP5 |
| | |
| | |

COVERED_NEIGHBORS

| SENSOR | NEIGHBOR |
|---|---|
| AP1 | AP2 |
| AP1 | AP3 |
| AP1 | AP4 |
| AP1 | AP5 |
| AP2 | AP1 |
| AP2 | AP6 |

AVAILABLE_SENSORS

| SENSOR |
|---|
| AP1 |
| AP2 |
| ~~AP3~~ |
| |

RADIO SENSOR COVERAGE ESTIMATION FOR WIRELESS NETWORK ASSURANCE

CROSS-REFERENCE TO RELATED APPLICATIONS

This application is a continuation of co-pending U.S. patent application Ser. No. 15/875,650, filed Jan. 19, 2018, which claims benefit of U.S. provisional patent application Ser. No. 62/527,810, filed Jun. 30, 2017. The aforementioned related patent application is herein incorporated by reference in its entirety.

BACKGROUND

High-density wireless deployments have become more common in recent years. With the proliferation of these deployments, monitoring network performance has become increasingly important to, for example, avoid network problems, ensure a desired performance level, and ensure compliance with service level agreements. In wireless networks system metrics and performance can vary significantly over time. Therefore, it is important to determine network health and performance on an ongoing basis.

This can be done using network sensors to measure network performance. For example, network technicians can visit a client site with dedicated sensors, and use these sensors to monitor and troubleshoot the network. But this is expensive, inefficient, and inflexible, requiring technicians to visit client sites in person and to set up dedicated sensors.

SUMMARY

An embodiment described herein is a network controller that includes a processor and a memory containing a program that, when executed on the processor, performs an operation. The operation includes estimating a first network sensor coverage level for a plurality of candidate access points (APs), based on potential use of the plurality of candidate APs as network sensors to measure at least one key performance indicator (KPI). The operation further includes determining a subset of the plurality of candidate APs, based on evaluating the plurality of candidate APs for suitability as network sensors. The operation further includes estimating a second network sensor coverage level for the subset of the plurality of candidate APs, based on potential use of the subset of the plurality of candidate APs as network sensors. The operation further includes determining that the second network sensor coverage level is within a pre-defined threshold of the first network sensor coverage level. The operation further includes provisioning a radio in each AP in the subset of the plurality of candidate APs as a network sensor to measure at least one KPI.

A further embodiment described herein is a computer program product that includes a non-transitory computer-readable storage medium having computer readable program code embodied on it, the computer readable program code executable by one or more computer processors to perform an operation. The operation includes estimating a first network sensor coverage level for a plurality of candidate APs, based on potential use of the plurality of candidate APs as network sensors to measure at least one KPI. The operation further includes determining a subset of the plurality of candidate APs, based on evaluating the plurality of candidate APs for suitability as network sensors. The operation further includes estimating a second network sensor coverage level for the subset of the plurality of candidate APs, based on potential use of the subset of the plurality of candidate APs as network sensors. The operation further includes determining that the second network sensor coverage level is within a pre-defined threshold of the first network sensor coverage level. The operation further includes provisioning a radio in each AP in the subset of the plurality of candidate APs as a network sensor to measure at least one KPI.

A further embodiment described herein is a method. The method includes estimating a first network sensor coverage level for a plurality of candidate APs, based on potential use of the plurality of candidate APs as network sensors to measure at least one key performance indicator (KPI). The method further includes determining a subset of the plurality of candidate APs, based on evaluating the plurality of candidate APs for suitability as network sensors. The method further includes estimating a second network sensor coverage level for the subset of the plurality of candidate APs, based on potential use of the subset of the plurality of candidate APs as network sensors. The method further includes determining that the second network sensor coverage level is within a pre-defined threshold of the first network sensor coverage level. The method further includes provisioning a radio in each AP in the subset of the plurality of candidate APs as a network sensor to measure at least one KPI

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 8A-8D illustrate an example of evaluating radio sensor coverage for the neighborhood illustrated in FIG. 3, according to an embodiment.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Instead of using on-site technicians and dedicated hardware, it is possible to determine the network health and performance of a wireless network using the existing Access Points (APs) in the wireless network as wireless sensors for other APs and clients. These sensors can be used to measure key performance indicators (KPI), continuously or at intervals, and can report any degradation in the key performance indicators. Key performance indicators may include: wireless client troubleshooting, radio performance, client throughput estimation, radio signal coverage, network authentication issues, coverage holes, and other indicators. Such degradation can be due to numerous factors including, for example, wireless interference.

When an AP is used as a sensor, however, the radio being used for sensing cannot be used to service clients. One solution is to setup dedicated APs to use as permanent sensors. This allows consistent monitoring of the network, but using a dedicated AP can be expensive, and many wireless deployments do not have spare APs available to serve as permanent sensors.

Another solution is to use as sensors APs that include a radio that is temporarily redundant and not currently necessary to service clients. To do this, one can identify available APs, and then select a subset of the available APs to use as sensors. These APs can then temporarily serve as sensors, and can measure the desired key performance indicators. In one embodiment, available APs can be identified through Flexible Radio Assignment (FRA) functionality, or other suitable methods. Algorithms can then be used to select which of the available APs to use as sensors in order to optimize the sensor coverage and functionality without tying up APs unnecessarily and without harming client service.

Figure 1:
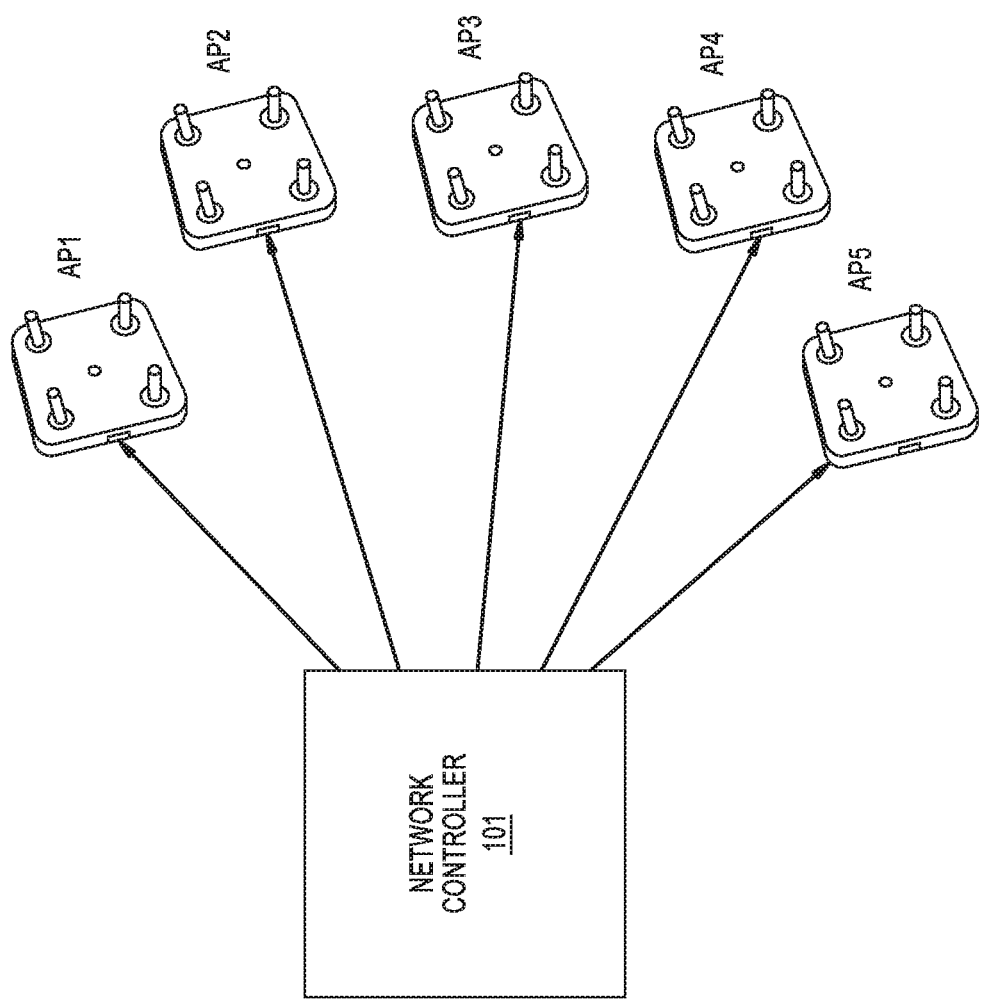
FIG. 1 illustrates a network controller controlling multiple Access Points (APs) in a network, according an embodiment.

FIG. 1 illustrates a network controller controlling a plurality of APs in a network, according to one embodiment herein. In FIG. 1, the network controller 101 controls a plurality of APs from AP1 to AP5. In one embodiment, each AP includes two radios where the first radio is a dedicated 5 GHz radio that transmits signals in the 5 GHz frequency band and the second radio is a XOR radio that can dynamically switch between the 2.4 GHz and 5 GHz frequency bands. That is, the second radio can transmit signals in either the 2.4 GHz frequency band or the 5 GHz frequency band. The two radios in an AP can be active simultaneously on the same frequency band or on different frequency bands. For example, the XOR radio and the dedicated 5 GHz radio in an AP can simultaneously transmit signals in the 5 GHz frequency band by using different channels of the 5 GHz frequency band. In one embodiment, the network controller 101 can be an AP, e.g., a master AP that can control other APs. In another embodiment, the network controller 101 can be a separate computing device. In another embodiment, the network controller 101 can be a device in a cloud computing environment.

In one embodiment, the APs can offer various services based on the network deployment and client density. For example, the AP1-AP5 have two operation modes, i.e., a local working mode and a non-client serving role. The operation modes apply to both radios of an AP. Also, the radios in AP1-AP5 have two radio roles, i.e., a dedicated radio role and an XOR radio role. In one embodiment, when operating in the local working mode, the dedicated 5 GHz radio transmits signals in the 5 GHz frequency band and the XOR radio transmits signals in either the 2.4 GHz frequency band or the 5 GHz frequency band. In the non-client serving role, however, the dedicated 5 GHz radio and the XOR radio do not transmit signals in either the 5 GHz or the 2.4 GHz frequency bands. Also, in one embodiment, in the non-client serving role, the radios consume lower power than in the local working mode. In another embodiment, in the non-client serving role, the radios are passive monitors that can receive signals transmitted on the 5 GHz or the 2.4 GHz frequency bands but do not transmit signals.

In one embodiment, the network controller 101 determines whether a radio in an AP is redundant. This can be done using Flexible Radio Assignment (FRA) functionality, which is discussed in more detail in U.S. patent application Ser. No. 15/475,577. That application's discussion of FRA, and associated network architecture and algorithms, is hereby incorporated by reference.

That is, the network controller 101 determines whether coverage area of the radio is already covered sufficiently (fully or almost fully) by at least one radio in a neighboring AP. For example, if AP1's XOR radio transmits signals using a channel of the 2.4 GHz frequency band and if AP2 and AP3's XOR radios also transmit signals using the same channel of the 2.4 GHz frequency band which cover the same area as AP1's XOR radio, then AP1's XOR radio is redundant. In this situation, AP1's redundant XOR radio may cause co-channel interference with AP2 and AP3's XOR radios.

If the network controller 101 determines that a radio in an AP is redundant in a frequency band, the network controller 101 manages the redundant radio to mitigate co-channel interference in the frequency band, e.g., the network controller 101 prohibits the redundant radio from transmitting signals in the frequency band. In one embodiment, the network controller 101 instructs AP1's XOR radio to switch to the 5 GHz frequency band. That is, the network controller 101 switches AP1's XOR radio to transmit signals in the 5 GHz frequency band, so that AP1's XOR radio does not transmit signals in the 2.4 GHz frequency band. Thus, the XOR radio of AP1 not only does not cause co-channel interference in the 2.4 GHz frequency band but also increases capacity in the 5 GHz frequency band. In another embodiment, the network controller 101 instructs AP1's XOR radio to change from the local working mode to the non-client serving role so that AP1's XOR radio does not transmit signals in the 2.4 GHz frequency band and does not cause co-channel interference in that band. In other embodiments, based on the network deployment and user preference, the network controller 101 instructs AP1's XOR radio to change from the local working mode to provide other services such as acting as a wireless sensor.

FIG. 1 illustrates only one embodiment herein. In other embodiments, the network controller 101 may control a different number of APs. Moreover, the APs may include a different number of radios. For example, the APs may include a dedicated 5 GHz radio, a dedicated 2.4 GHz radio, and a XOR radio. In other embodiments, the radios of the APs may transmit signals in frequency bands different from the 5 GHz frequency band and the 2.4 GHz frequency band, as understood by an ordinary person in the art.

Figure 2:
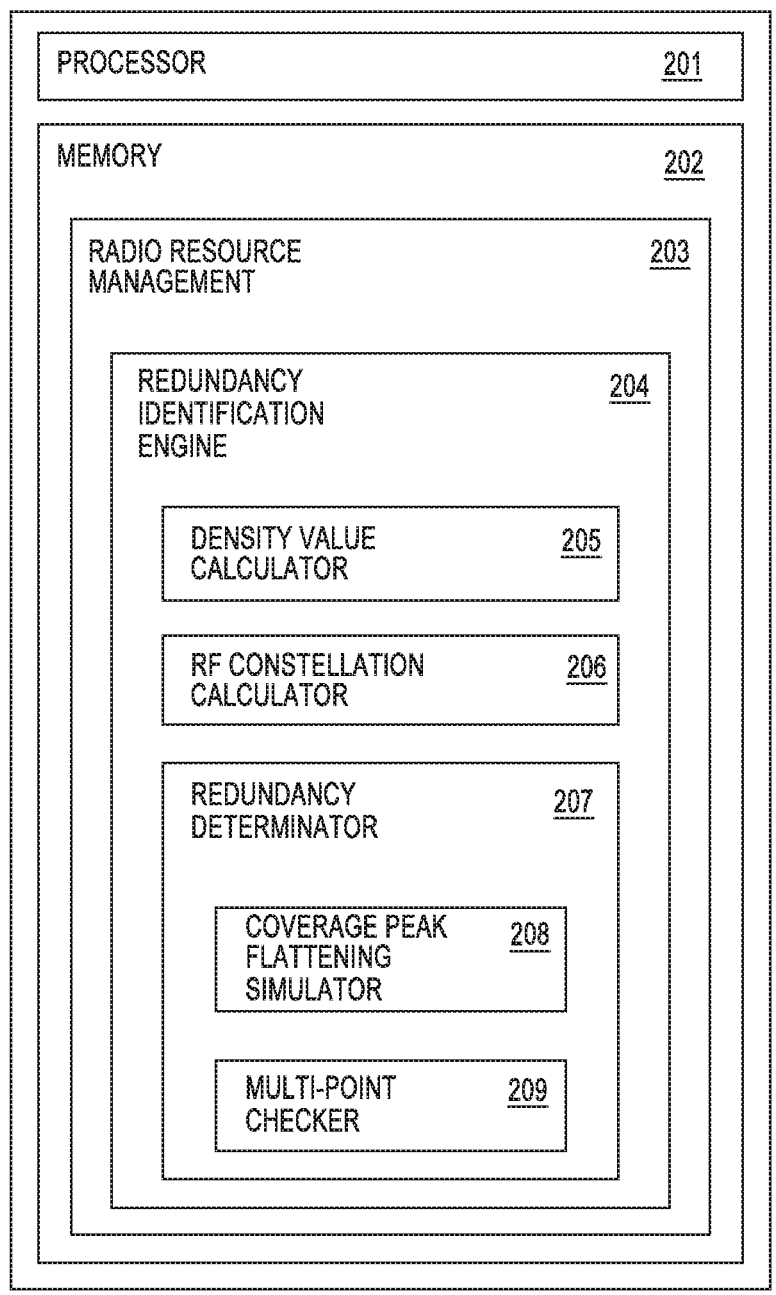
FIG. 2 illustrates a network controller, according to an embodiment.

FIG. 2 illustrates the network controller 101, according to one embodiment herein. The network controller 101 includes a processor 201 and a memory 202. The processor 201 may be any computer processor capable of performing the functions described herein. Although memory 202 is shown as a single entity, memory 202 may include one or more memory devices having blocks of memory associated with physical addresses, such as random access memory (RAM), read only memory (ROM), flash memory or other types of volatile and/or non-volatile memory.

The memory 202 includes a radio resource management (RRM) component 203. The RRM component 203 provides a system level management of co-channel interference, radio resources, and other radio transmission characteristics in the network. The RRM component 203 includes core algorithms for controlling parameters such as transmit power, user allocation, beamforming, data rates, handover criteria, modulation scheme, error coding scheme, etc. The RRM component 203 aims to utilize the radio-frequency resources and radio network infrastructure in an efficient way.

In one embodiment, the RRM component 203 receives inter-radio measurement data reported from the APs controlled by the network controller 101. The inter-radio measurement data may include but is not limited to the channel frequency between two radios of different APs, transmit power, antenna information and the received signal strength indicator (RSSI) or path loss between two radios of different APs.

In one embodiment, the RRM component 203 performs the inter-radio measurement based on a neighbor discovery protocol (NDP). By using NDP, each radio in each AP sends a broadcast message to all other radios in all other APs on all channels so that all other radios operating on different channels can receive the broadcast message. The broadcast message may be a neighbor discovery packet with a predefined packet format. When a radio in an AP receives the neighbor discovery packet, it uses the neighbor discovery packet to obtain the inter-radio measurement data, and forwards the neighbor discovery packet and the inter-radio measurement data to the RRM component 203. Based on the received neighbor discovery packet and the inter-radio measurement data, the RRM component 203 can understand how every radio using a channel hears every other radio using the same channel and how every AP relates to other APs in the network controlled by the network controller 101.

The RRM component 203 includes a redundancy identification engine (RIE) 204. Based on the measurement data received by the RRM component 203, the RIE 204 can identify redundant radios in APs in a frequency band. The RIE 204 includes a density value calculator 205, a radio frequency (RF) constellation calculator 206 and a redundancy determinator 207. The density value calculator 205 identifies candidate APs for redundancy determination, the RF constellation calculator 206 calculates relative locations of neighboring APs, and the redundancy determinator 207 determines whether a radio in an AP is redundant.

The redundancy determinator 207 includes a coverage peak flattening simulator 208 and a multi-point checker 209. The coverage peak flattening simulator 208 models a total coverage area covered by radios in a plurality of APs and determines whether multiple radios are covering an overlapping area of the total coverage area. The coverage peak flattening simulator 208 also predicts an impact to the total coverage area if a radio in a selected AP does not transmit signals in a frequency band.

After the coverage peak flattening simulator 208 determines that the impact to total coverage area is acceptable if the radio in the selected AP does not transmit signals in a frequency band, the multi-point checker 209 further checks whether the radio is contributing to coverage areas of one or more radios in neighboring APs that are already determined as redundant. For example, if a radio in a neighboring AP does not transmit signals in the frequency band because the radio in the neighboring AP was previously identified by the RIE 204 as redundant, the multi-point checker 209 checks whether the radio in the selected AP is transmitting signals in the original coverage area (the coverage area before the redundant radio is prohibited from transmitting signals) of the redundant radio in the neighboring AP. If the coverage area of the radio in the selected AP does not overlap with the coverage areas of one or more radios in neighboring APs that are already determined as redundant, the multi-point checker 209 further ensures that the coverage area of the radio in the selected AP is sufficiently covered by one or more radios in neighboring APs that are transmitting signals in the frequency band. Algorithms implemented by the coverage peak flattening simulator 208 and the multi-point checker 209 are discussed in more detail in U.S. patent application Ser. No. 15/475,577, and are hereby incorporated by reference.

Figure 3:
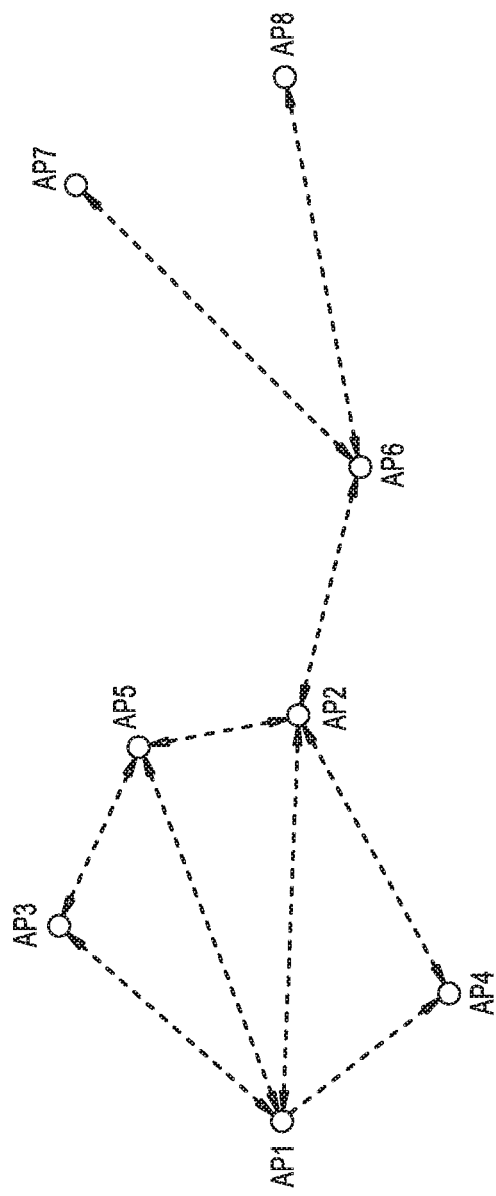
FIG. 3 illustrates a neighborhood including multiple APs, according to an embodiment.

FIG. 3 illustrates a neighborhood including multiple APs, according to one embodiment herein. The dotted lines and arrows between APs represent neighbor relationships. For example, AP3 is a TX neighbor of AP1, meaning at least one of AP1s radios can reach AP3. This is illustrated with the dotted line between AP1 and AP3 and the arrow pointing from AP1 to AP3. AP3 is also an RX neighbor of AP1, meaning at least one of AP3's radios can reach AP1. This is illustrated with the arrow pointing from AP3 to AP1.

As illustrated in FIG. 3, AP1 has four neighbors: AP3, AP5, AP2, and AP4. AP2 has three neighbors: AP5, AP4, and AP6. AP3 has two neighbors: AP1 and AP5; AP4 has two neighbors: AP1 and AP2; and AP5 has three neighbors, AP3, AP2, and AP1. Each of these are both TX and RX neighbors, as illustrated by the arrows in FIG. 3. The neighbor relationships illustrated in FIG. 3 will be discussed in more detail with regard to FIGS. 8A-8D.

Figure 4:
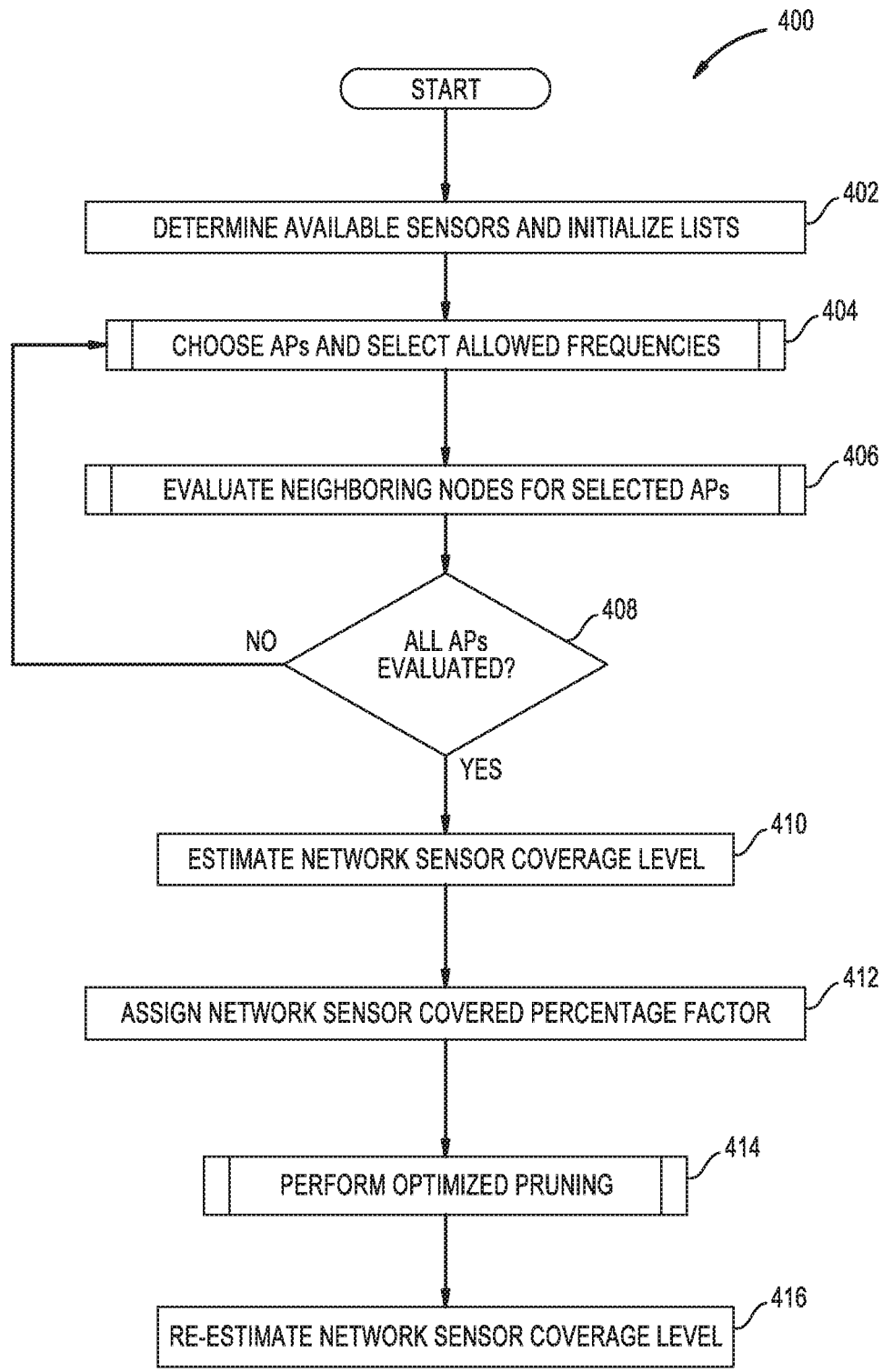
FIG. 4 is a flowchart for evaluating radio sensor coverage, according to an embodiment.

FIG. 4 is a flowchart for evaluating radio sensor coverage, according to an embodiment. In one embodiment, FIG. 4 relates to a wireless LAN network with a number of APs. At step 402, the system is initialized and maintains three buckets of APs: Available_Sensors, Covered_Neighbors, and Supplementary_List. Covered_Neighbors and Supplementary_List are initially empty. Available_Sensors is initialized with a list of candidate APs. There are various ways to identify the Available_Sensors candidate APs in a given network. In one embodiment, the system chooses the radios that have no load/clients (or the smallest load) as the Available_Sensors, or radios that are covered by multiple neighbors as the Available_Sensors, or a combination of both. Alternatively, the Available_Sensors can be identified using an FRA algorithm to determine redundant APs in the network as discussed in FIG. 2, above. For example, an FRA algorithm can be used to identify APs that include at least one radio that is redundant, meaning the radio is not necessary for client service. The Available_Sensors bucket can be populated with these APs.

At step 404, the system chooses an AP from the Available_Sensors bucket and evaluates the AP's suitability for use as a network sensor based on various sensor-coverage factors. A sensor-coverage factor can be any factor used to evaluate the AP's suitability to act as a network sensor. For example, the system can select the allowed frequencies for sensor operation for the selected AP. The allowed frequencies for sensor operation are an example of a sensor-coverage factor, as is the base power range (discussed in more detail with regard to step 506 in FIG. 5). The system also gathers information on the selected AP's neighbors, and generates a list of neighbors. This is another example of a sensor-coverage factor. Step 404 is discussed in more detail with regard to FIG. 5.

As another example, at step 406, the system evaluates the neighboring nodes or APs for transmit cell size. As part of this process, in one embodiment, the system can evaluate signal to noise ratio (SNR) for TX neighbors. These are additional examples of sensor-coverage factors. Step 406 is discussed in more detail with regard to FIG. 6.

At step 408, the system checks the bucket of Available_Sensors to determine whether it has evaluated each of the sensors in this bucket. If not, the system returns to step 404. The system repeats steps 404 and 406 until all the APs in the Available_Sensors bucket have been evaluated.

If all of the APs in the Available_Sensors bucket have been evaluated, the system proceeds to step 410. At step 410, the system estimates the network sensor coverage level. For example, the system can estimate how much of the network could be measured if all of the APs in the Available_Sensors bucket were used as network sensors. The estimate can be generated by measuring statistics for each AP per sector, for the overall network, or for both. A sector can be, for example, a local area that is relatively isolated from other APs, such as an auditorium or a large conference room. One example of a measured statistic used in generating the estimate is "Network Sensor Coverage," which compares nodes under Covered_Neighbors against the total radios in the RF group. Another example of a measured statistic is "Localized RF Sector Sensor Coverage," which measures the number of Covered_Neighbors per site, divided by the radios subscribed to that site. Another example of a measured statistic is "Radio Sensor Coverage", which is the measured Covered_Neighbors per radio divided by the total TX neighbors At step 412, the system assigns a network sensor covered percentage factor to the RF domain, the localized RF sectors, or both. For example, the assignment can involve storing heuristics and statistical measurements in a centralized database. The network controller can push the heuristics and measurements to group members, which can store the information in a database.

At step 414, the system performs optimized pruning, which removes unnecessary sensors from the Available_Sensors bucket. Step 414 is described in more detail with regard to FIG. 7. At step 416, the system re-estimates the network sensor coverage level after performing the optimized pruning in step 414. This estimate can be done on a per-site basis, on an overall basis, or both. In one embodiment, the system ensures that the per-site sensor coverage, the overall sensor coverage, or both, remain within a pre-defined threshold of 100% or of the value computed in step 410. This pre-defined threshold can be 0, meaning that the re-estimated coverage level must be the same as the value computed at step 410, or it can be any suitable threshold value.

Figure 5:
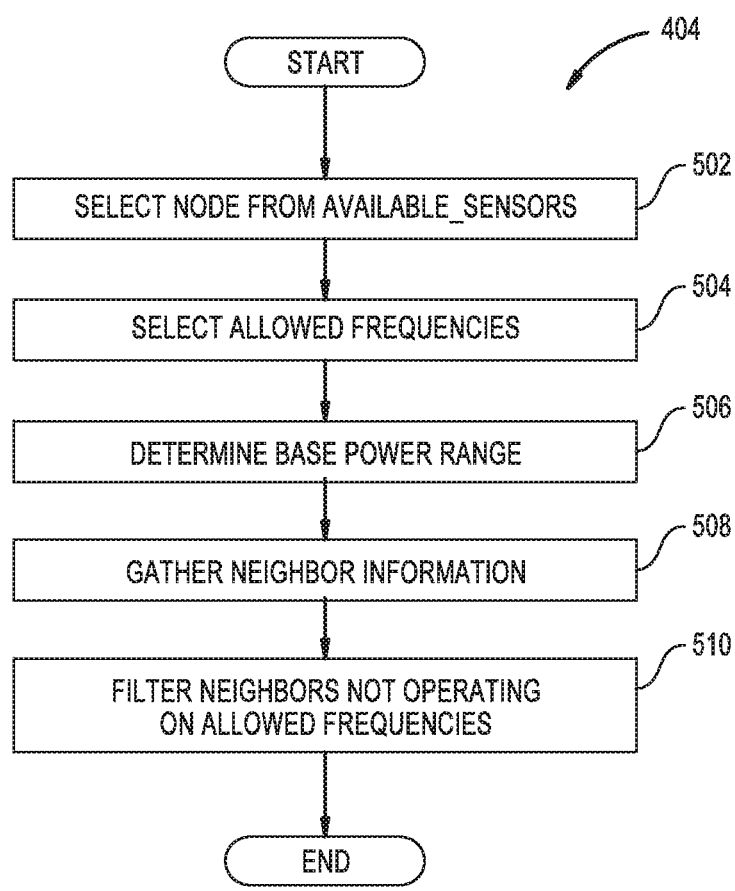
FIG. 5 is a flowchart for choosing APs and selecting allowed frequencies when evaluating radio sensor coverage, according to an embodiment.

FIG. 5 is a flowchart for choosing APs and selecting allowed frequencies when evaluating radio sensor coverage, according to an embodiment. FIG. 5 provides more detail regarding step 404 of FIG. 4, discussed above. At step 502, the system selects a candidate AP from the bucket of Available_Sensors.

At step 504, the system selects the allowed sensor frequencies, should the candidate AP be used as a network sensor. The system starts with a list of available frequencies, and chooses a subset of frequencies based on PHY constraints. PHY constraints are hardware constraints of the selected radio that can prevent sensor operation. For example, as discussed above with regard to FIG. 1, an AP may have two radios, a master radio operating at 5 GHz and an XOR radio that can selectively operate at either 5 GHz or 2.4 GHz. In one embodiment, the master radio can be used for client operation, while the XOR radio is used for sensing. But if the wrong frequency is chosen for sensing, the XOR radio could interfere with the client operation of the master radio. For example, the XOR radio may interfere if it uses a frequency that is within 100 MHz, from spectrum edge to spectrum edge, of the master radio. The XOR radio may have a limited set of available 5 GHz frequencies that avoid this interference.

In another embodiment, either the master or XOR radio can be used for sensing. Either radio, when used for sensing, could interfere with client operation of a nearby AP if the wrong frequency is chosen. In this embodiment the system can choose frequencies that will not interfere with neighboring APs. In both circumstances, the system selects the frequencies that are sufficiently isolated from nearby radios, whether the nearby radio is in the same AP or in a nearby AP. These selected frequencies can be termed White List Frequencies.

Once the system determines the White List Frequencies, it can determine channel quality for these frequencies. Some channels may have additional Wi-Fi or non-Wi-Fi interference. This interference can limit sensor operation on that channel. To avoid using a low quality channel, the system can determine a Channel Quality Index for each channel, compare that Channel Quality Index with a CLEAR_CHANNEL_CRITERIA_THRESHOLD (e.g., 25%), and only select channels for which the Channel Quality Index is above the threshold. In one embodiment, the allowed frequencies are the frequencies that both meet the PHY constraints and the channel quality threshold.

At step 506, the system establishes a base power range within the frequencies. When an AP is used as a sensor, the AP operates as a wireless client. This means the power level of the AP's sensor radio can be governed by the target AP for which the sensor AP is acting as a client, and so the power level of the sensor radio can drop during operation. The system, therefore, can determine the lowest power level, across the available power levels and for each frequency, at which the sensor radio can reach the target APs and act as a sensor. In one embodiment, this is done using the Unlicensed National Information (UNI) bands.

At step 508, the system gathers neighbor information for the sensor candidate AP. This information comes from both TX and RX neighbors that surround the candidate sensor AP. In one embodiment, at step 510 the system filters and removes neighboring APs that are not at operating the allowed frequencies of the candidate sensor AP.

Figure 6:
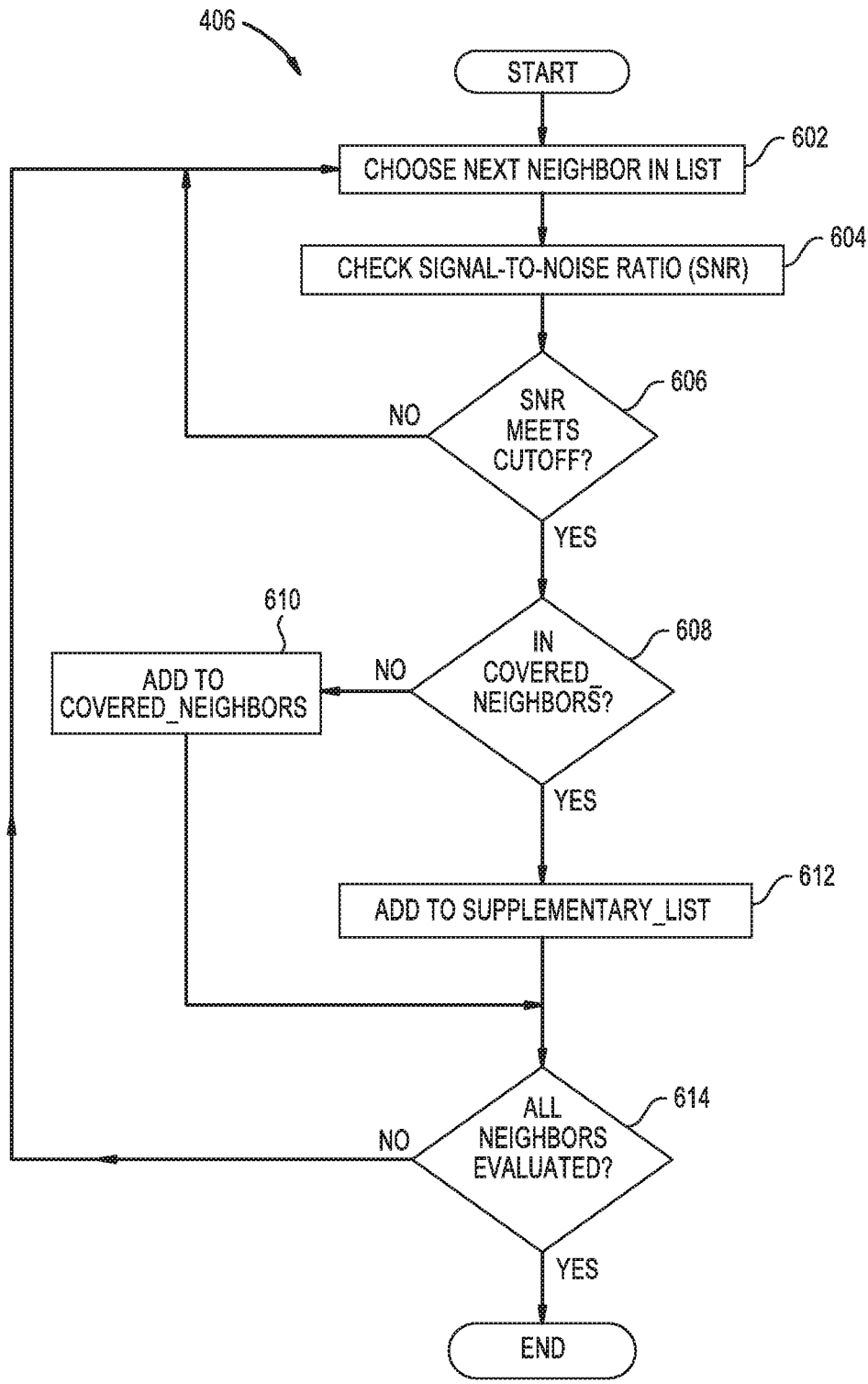
FIG. 6 is a flowchart for evaluating neighboring nodes for an AP when evaluating radio sensor coverage, according to an embodiment.

FIG. 6 is a flowchart for evaluating neighboring nodes for an AP when evaluating radio sensor coverage, according to an embodiment. FIG. 6 provides more detail regarding step 406 of FIG. 4, discussed above. At step 602, the system chooses the next neighbor in the list of TX and RX neighbors for the candidate AP. This list can come from, for example, the gathering of neighbor information at step 508, discussed above.

At step 604, the system evaluates the signal-to-noise ratio (SNR) for the radio. The SNR can affect the ability of the candidate AP to sense the neighbor. At step 606 the system checks whether the SNR meets the Sensor_Boundary_SNR_Cutoff. This ensures that the SNR is sufficient for the desired sensing. In one embodiment, the Sensor_Boundary_SNR_Cutoff is a dynamic threshold that varies according to an active client profile (e.g., type of client such as mobile phone, tablet, laptop, etc.), data type (e.g., voice video, or best effort), and/or test requirements (e.g., a ping-equivalent test or link estimation). The Sensor_Boundary_SNR_Cutoff can be set to a default value (e.g., 35). The Sensor_Boundary_SNR_Cutoff can also be configured by a user. For example, the system could provide a user interface with a slider bar, with which the user can configure the cutoff.

If the SNR does not meet the Sensor_Boundary_SNR_Cutoff, the system returns to step 602 and evaluates the next neighbor. If the SNR meets the Sensor_Boundary_SNR_Cutoff, the system proceeds to step 608. At step 608, the system determines whether the neighbor is already present in the Covered_Neighbors bucket. If the neighbor is not already present in the bucket, the system proceeds to step 610 and adds the neighbor to the Covered_Neighbors bucket. If the neighbor is already present in the Covered_Neighbors bucket, the system adds the neighbor to the Supplementary_List. The candidate AP can also be stored in the Supplementary_List, so that the relationship from candidate AP->neighbor is recorded. Storage in the Supplementary_List indicates that multiple candidate APs cover the same neighbor and permits the system to represent multiple APs covering similar RF zones.

At step 614, the system checks whether all suitable neighbors for the candidate AP have been evaluated. If not, the system returns to step 602 and proceeds to evaluate the next neighbor. If so, the system concludes this portion of the process and proceeds to step 408 in FIG. 4, discussed above.

Figure 7:
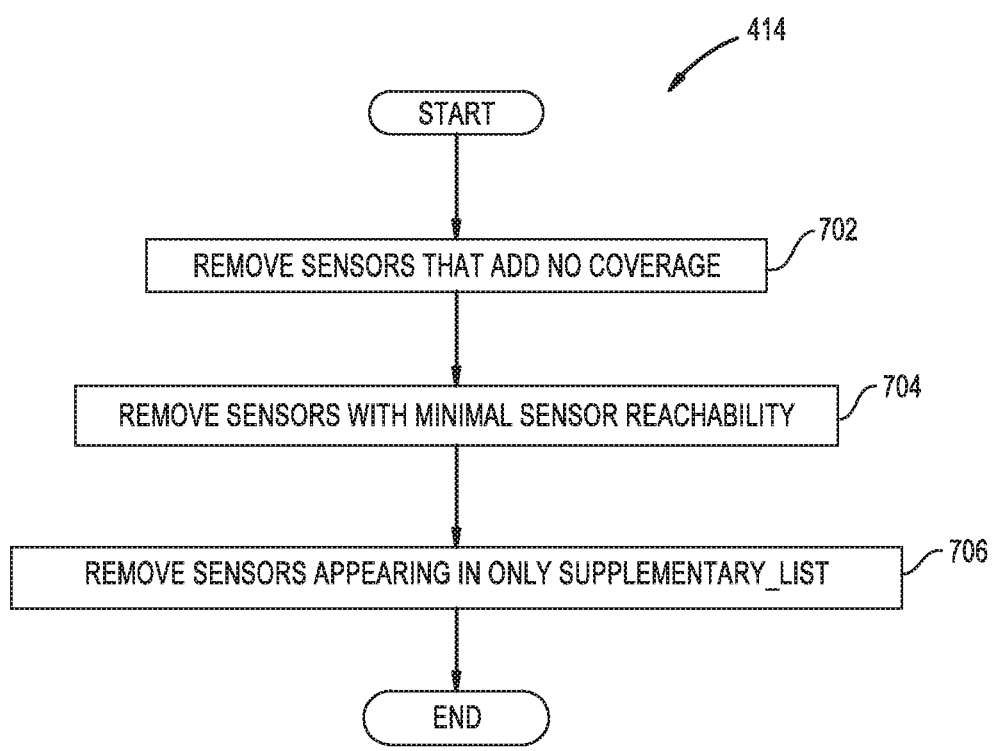
FIG. 7 is a flowchart for optimized pruning when evaluating radio sensor coverage, according to an embodiment.

FIG. 7 is a flowchart for optimized pruning when evaluating radio sensor coverage, according to an embodiment. FIG. 7 provides more detail regarding step 414 of FIG. 4, discussed above. At step 702, the system removes from the Available_Sensors bucket APs which produce zero coverage or have a zero reachability factor. At step 704, the system evaluates APs with minimal sensor reachability. For example, when sensor reachability is minimal, the system evaluates whether other candidate sensor APs can reach the Covered_Neighbors of this radio. If other candidate sensor APs can cover all the neighbors covered by this candidate sensor AP, as denoted in the Covered_Neighbors bucket, this candidate sensor AP can be removed from the Available_Sensors bucket. As part of this process, neighbors may be moved from the Supplementary_List to the Covered_Neighbors bucket.

At step 706, the system removes APs appearing only in the Supplementary_List. As discussed above, with regard to step 612 in FIG. 6, a neighbor appears in the Supplementary_List if the neighbor is already included in the Covered_Neighbors bucket. An AP that appears only in the Supplementary_List is not necessary for full sensor coverage, because each of the neighbors it covers is already covered by another candidate sensor AP. This is discussed in more detail with regard to FIGS. 8A-8D.

FIGS. 8A-8D illustrate a partial example of evaluating radio sensor coverage for the neighborhood illustrated in FIG. 3, according to an embodiment. Assume, for example, that an FRA algorithm identifies AP1, AP2, and AP3 as candidate sensor APs. Following along with FIG. 4, and as shown in FIG. 8A, at step 402 each of the candidate APs is added to the Available_Sensors bucket.

At step 404, the system chooses the first candidate AP (here AP1) and selects the allowed frequencies. This process is described in more detail with regard to FIG. 5, and will not be repeated here. Assume for purposes of this example that each of AP1's neighbors meet the frequency and power criteria described with regard to FIG. 5. At step 406, and as discussed in more detail with regard to FIG. 6, the system evaluates the neighbor nodes for AP1. As illustrated in FIG. 3, AP1 has four neighbors: AP2, AP3, AP4, and AP5. Because AP1 is the first candidate AP being evaluated, the Covered_Neighbors bucket is initially empty, and so each of these neighbors are added to the Covered_Neighbors bucket (none are added to the Supplemental_List bucket).

FIG. 8B illustrates evaluation of the next candidate in the example, AP2. AP2 has four neighbors: AP1, AP4, AP5, and AP6. Assume again that each of these neighbors meets the frequency and power criteria described with regard to FIG. 5. The first neighbor, AP1, does not yet appear in the Covered_Neighbors bucket, and so it is added to Covered_Neighbors. The next two neighbors, AP4 and AP5, already appear in Covered_Neighbors, so they are added to the Supplemental List. The final neighbor, AP6, does not appear in Covered_Neighbors, so it is added to Covered_Neighbors.

FIG. 8C illustrates evaluation of the final candidate in the example, AP3. AP3 has two neighbors: AP1 and AP5. Assume again that each of these neighbors meets the frequency and power criteria described with regard to FIG. 5. Each of these neighbors already appears in the Covered_Neighbors bucket, and so AP1 and AP5 are each added to the Supplemental_List.

This is the final candidate AP in the example, so the system moves to step 410 illustrated in FIG. 4. Steps 410 and 412 are discussed above with regard to FIG. 4, and will not be repeated here. FIG. 8D illustrates step 414: optimized pruning, discussed in more detail with regard to FIG. 7.

At steps 702 and 704, illustrated in FIG. 7, the system evaluates the sensor reachability of the candidates. Assume for this example that all three candidate APs have more than minimal sensor reachability. None of the sensors are removed in steps 702 and 704, and the system proceeds to step 706. At step 706, the system removes any sensor appearing only in the Supplemental_List. Here, AP3 appears only in the Supplemental_List because both of its neighbors are already covered by AP1 and AP2. This means that when AP1 and AP2 are used as sensors, they can generate KPI for all of AP3's neighbors, and so AP3 is redundant. AP3 is therefore removed from the Available_Sensors bucket and is not used as a sensor. AP3 can be left free for client service or other tasks. The system then undertakes a final evaluation of sensor coverage, as illustrated by step 416 of FIG. 4, and the process concludes.

The embodiments described above provide sensor coverage estimation for network service assurance. One objective of this framework is to highlight a minimum set of sensor APs with the highest reachability factor that could be used to cover multiple nearby nodes, while at the same time removing unavailing and redundant sensor APs that do not provide additional insight. For a given deployment, these embodiments can showcase per sensor, per site, and overall sensor coverage, which is useful for network administrators to gain insights into different sensor coverage zones and potential areas where additional sensors can be placed. Further, network administrators can use data received from the sensors to troubleshoot, and to verify network reliability and efficiency.

Several non-limiting advantages of the disclosed embodiments include providing sensor reachability/coverage estimates for network service assurance, ensuring only effective sensor APs are chosen, measuring key performance indicators across nodes, providing a dynamic list of sensor nodes based on the network policy and user requirements, incorporating physical RF constraints to make the system portable across different WLAN vendors, and providing granular insight into per radio sensor coverage along with network wide sensor coverage. Further, the embodiments herein highlight sites where additional sensor APs would be beneficial.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A network controller, comprising:
a processor; and
a memory containing a program that, when executed on the processor, performs an operation, the operation comprising:
estimating a first network sensor coverage level for a plurality of candidate access points (APs), based on potential use of the plurality of candidate APs as network sensors to measure a first performance indicator;
determining a subset of the plurality of candidate APs, based on evaluating the plurality of candidate APs for suitability as network sensors, comprising:
identifying a first redundant AP based on comparing an identifier associated with an AP in the plurality of candidate APs with a list of covered neighbor APs and a list of supplemental neighbor APs; and
selecting the subset of the plurality of candidate APs from the plurality of candidate APs such that the subset does not include the first redundant AP;
estimating a second network sensor coverage level for the subset of the plurality of candidate APs, based on potential use of the subset of the plurality of candidate APs as network sensors;
determining that the second network sensor coverage level is within a pre-defined threshold of the first network sensor coverage level; and
provisioning a radio in each AP in the subset of the plurality of candidate APs as a network sensor to measure a second performance indicator.

2. The network controller of claim 1, wherein evaluating the plurality of candidate APs for suitability as network sensors, comprises:
selecting a first AP of the plurality of candidate APs; and
determining a plurality of allowed frequencies for the first AP.

3. The network controller of claim 2, wherein evaluating the plurality of candidate APs for suitability as network sensors further comprises;
determining a base power range for the first AP; and
determining one or more neighbor APs for the first AP.

4. The network controller of claim 3, wherein determining the one or more neighbor APs for the first AP further comprises:
selecting a first neighbor AP of the one or more neighbor APs; and
determining that the first neighbor AP is operating on at least one of the plurality of allowed frequencies.

5. The network controller of claim 3, wherein evaluating the plurality of candidate APs for suitability as network sensors further comprises:
selecting a first neighbor AP of the one or more neighbor APs; and
evaluating a signal-to-noise ratio related to the first neighbor AP based on a pre-determined cutoff.

6. The network controller of claim 3, wherein evaluating the plurality of candidate APs for suitability as network sensors further comprises:
selecting a first neighbor AP of the one or more neighbor APs; and
adding an identifier associated with the first neighbor AP to a list of covered neighbors based on determining that the identifier is not already present in the list of covered neighbors.

7. The network controller of claim 1, wherein determining the subset of the plurality of candidate APs, based on evaluating the plurality of candidate APs for suitability as network sensors further comprises:
identifying a first one or more unnecessary APs of the plurality of candidate APs that produce zero sensor coverage or have a zero sensor reachability factor;
identifying a second one or more unnecessary APs of the plurality of candidate APs that have minimal sensor reachability; and
selecting the subset of the plurality of candidate APs from the plurality of candidate APs such that the subset does not include the first one or more unnecessary APs and the second one or more unnecessary APs.

8. The network controller of claim 1, wherein the first performance indicator and the second performance indicator are the same performance indicator.

9. A computer program product, comprising:
a non-transitory computer-readable storage medium having computer readable program code embodied therewith, the computer readable program code executable by one or more computer processors to perform an operation, the operation comprising:
estimating a first network sensor coverage level for a plurality of candidate access points (APs) in a communication network, based on potential use of the plurality of candidate APs as network sensors to measure a first performance indicator, wherein the first network sensor coverage level relates to a first region of coverage of the communication network for which the first performance indicator can be measured by the plurality of candidate APs acting as network sensors;
determining a subset of the plurality of candidate APs, based on evaluating the plurality of candidate APs for suitability as network sensors;
estimating a second network sensor coverage level for the subset of the plurality of candidate APs, based on potential use of the subset of the plurality of candidate APs as network sensors, wherein the second network sensor coverage level relates to a second region of coverage of the communication network for which the first performance indicator can be measured by the subset of the plurality of candidate APs acting as network sensors;
determining that the second network sensor coverage level is within a pre-defined threshold of the first network sensor coverage level; and
provisioning a radio in each AP in the subset of the plurality of candidate APs as a network sensor to measure a second performance indicator.

10. The computer program product of claim 9, wherein evaluating the plurality of candidate APs for suitability as network sensors further comprises:
selecting a first AP of the plurality of candidate APs;
determining a plurality of allowed frequencies for the first AP;
determining a base power range for the first AP; and
determining one or more neighbor APs for the first AP.

11. The computer program product of claim 10, wherein determining one or more neighbor APs for the first AP further comprises:
selecting a first neighbor AP of the one or more neighbor APs; and
determining that the first neighbor AP is operating on at least one of the plurality of allowed frequencies.

12. The computer program product of claim 10, wherein evaluating the plurality of candidate APs for suitability as network sensors further comprises:

selecting a first neighbor AP of the one or more neighbor APs;

evaluating a signal-to-noise ratio related to the first neighbor AP based on a pre-determined cutoff; and adding an identifier associated with the first neighbor AP to a list of covered neighbors based on determining that the identifier is not already present in the list of covered neighbors.

13. The computer program product of claim 9, wherein determining the subset of the plurality of candidate APs, based on evaluating the plurality of candidate APs for suitability as network sensors, further comprises:

identifying a first one or more unnecessary APs of the plurality of candidate APs that produce zero sensor coverage or have a zero sensor reachability factor;

identifying a second one or more unnecessary APs of the plurality of candidate APs that have minimal sensor reachability; and selecting the subset of the plurality of candidate APs from the plurality of candidate APs such that the subset does not include the first one or more unnecessary APs and the second one or more unnecessary APs.

14. The computer program product of claim 9, wherein determining the subset of the plurality of candidate APs, based on evaluating the plurality of candidate APs for suitability as network sensors, further comprises:

identifying a first redundant AP based on comparing an identifier associated with an AP in the plurality of candidate network APs with a list of covered neighbor APs and a list of supplemental neighbor APs; and selecting the subset of the plurality of candidate APs from the plurality of candidate APs such that the subset does not include the first redundant AP.

15. A method, comprising:

estimating a first network sensor coverage level for a plurality of candidate access points (APs) in a communication network, based on potential use of the plurality of candidate APs as network sensors to measure a first performance indicator, wherein the first network sensor coverage level relates to a first region of coverage of the communication network for which the first performance indicator can be measured by the plurality of candidate APs acting as network sensors;

determining a subset of the plurality of candidate APs, based on evaluating the plurality of candidate APs for suitability as network sensors;

estimating a second network sensor coverage level for the subset of the plurality of candidate APs, based on potential use of the subset of the plurality of candidate APs as network sensors, wherein the second network sensor coverage level relates to a second region of coverage of the communication network for which the first performance indicator can be measured by the subset of the plurality of candidate APs acting as network sensors;

determining that the second network sensor coverage level is within a pre-defined threshold of the first network sensor coverage level; and provisioning a radio in each AP in the subset of the plurality of candidate APs as a network sensor to measure a second performance indicator.

16. The method of claim 15, wherein evaluating the plurality of candidate APs for suitability as network sensors further comprises:

selecting a first AP of the plurality of candidate APs;

determining a plurality of allowed frequencies for the first AP;

determining a base power range for the first AP; and determining one or more neighbor APs for the first AP.

17. The method of claim 16, wherein determining one or more neighbor APs for the first AP further comprises:

selecting a first neighbor AP of the one or more neighbor APs; and determining that the first neighbor AP is operating on at least one of the plurality of allowed frequencies.

18. The method of claim 16, wherein evaluating the plurality of candidate APs for suitability as network sensors further comprises:

selecting a first neighbor AP of the one or more neighbor APs;

evaluating a signal-to-noise ratio related to the first neighbor AP based on a pre-determined cutoff; and adding an identifier associated with the first neighbor AP to a list of covered neighbors based on determining that the identifier is not already present in the list of covered neighbors.

19. The method of claim 15, wherein determining the subset of the plurality of candidate APs, based on evaluating the plurality of candidate APs for suitability as network sensors further comprises:

identifying a first one or more unnecessary APs of the plurality of candidate APs that produce zero sensor coverage or have a zero sensor reachability factor;

identifying a second one or more unnecessary APs of the plurality of candidate APs that have minimal sensor reachability; and selecting the subset of the plurality of candidate APs from the plurality of candidate APs such that the subset does not include the first one or more unnecessary APs and the second one or more unnecessary APs.

20. The method of claim 15, wherein determining the subset of the plurality of candidate APs, based on evaluating the plurality of candidate APs for suitability as network sensors further comprises:

identifying a first redundant AP based on comparing an identifier associated with an AP in the plurality of candidate network APs with a list of covered neighbor APs and a list of supplemental neighbor APs; and selecting the subset of the plurality of candidate APs from the plurality of candidate APs such that the subset does not include the first redundant AP.

* * * * *